United States Patent
Choi

(10) Patent No.: US 10,730,470 B2
(45) Date of Patent: Aug. 4, 2020

(54) INFLATABLE SAFETY RESTRAINT SYSTEM FOR SURROUNDING A VEHICLE OCCUPANT

(71) Applicant: AUTOLIV ASP, INC., Ogden, UT (US)

(72) Inventor: Changsoo Choi, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 16 days.

(21) Appl. No.: 16/035,807

(22) Filed: Jul. 16, 2018

(65) Prior Publication Data
US 2020/0017059 A1  Jan. 16, 2020

(51) Int. Cl.
| | | |
|---|---|---|
| B60R 21/00 | (2006.01) | |
| B60R 21/214 | (2011.01) | |
| B60R 21/231 | (2011.01) | |
| B60R 21/232 | (2011.01) | |
| B60R 21/2338 | (2011.01) | |
| B60R 21/16 | (2006.01) | |

(52) U.S. Cl.
CPC .......... B60R 21/214 (2013.01); B60R 21/232 (2013.01); B60R 21/2338 (2013.01); B60R 21/23138 (2013.01); *B60R 2021/161* (2013.01); *B60R 2021/23107* (2013.01); *B60R 2021/23192* (2013.01); *B60R 2021/23382* (2013.01); *B60R 2021/23386* (2013.01)

(58) Field of Classification Search
CPC .... B60R 2021/23192; B60R 21/23138; B60R 21/232; B60R 21/2338; B60R 2021/161; B60R 2021/23107; B60R 2021/23382; B60R 2021/23386

USPC ....................................................... 280/730.1
See application file for complete search history.

(56) References Cited

U.S. PATENT DOCUMENTS

| | | | | |
|---|---|---|---|---|
| 3,795,412 A | * | 3/1974 | John ....................... | B60R 21/08 280/730.1 |
| 4,227,717 A | * | 10/1980 | Bouvier .................. | B60R 21/16 280/753 |
| 8,414,017 B2 | * | 4/2013 | Lee ........................ | B60R 21/231 280/730.1 |
| 8,579,321 B2 | * | 11/2013 | Lee ........................ | B60R 21/214 280/729 |
| 9,156,426 B1 | * | 10/2015 | Faruque ................. | B60R 21/207 |
| 9,744,932 B1 | * | 8/2017 | Faruque ................. | B60R 21/16 |
| 9,789,840 B2 | * | 10/2017 | Farooq .................... | B60N 2/14 |
| 9,944,246 B2 | * | 4/2018 | Ohno ................. | B60R 21/23138 |
| 9,981,624 B2 | * | 5/2018 | Perlo ................. | B60R 21/23138 |

(Continued)

FOREIGN PATENT DOCUMENTS

WO   WO-2012144748 A2 * 10/2012 ........... B60R 21/232

*Primary Examiner* — Paul N Dickson
*Assistant Examiner* — Hilary L Johns
(74) *Attorney, Agent, or Firm* — Stephen T. Olson; Harness, Dickey & Pierce, P.L.C.

(57) ABSTRACT

An inflatable safety restraint system that is downwardly deployable from a roof of a vehicle for protecting an occupant of the vehicle. The inflatable safety restraint system includes at least one inflatable airbag and at least one joint closing the shape of the at least one inflatable airbag to circumscribe an internal cavity. At least one inflator is in fluid communication with the at least one inflatable airbag for inflating the at least one airbag. Upon deployment, the inflatable safety restraint system defines a closed shape for surrounding the occupant of the vehicle.

14 Claims, 8 Drawing Sheets

(56) References Cited

U.S. PATENT DOCUMENTS

| | | | |
|---|---|---|---|
| 10,246,043 B2* | 4/2019 | Schneider | B60R 21/214 |
| 2004/0251668 A1* | 12/2004 | Schneider | B60R 21/237 |
| | | | 280/743.1 |
| 2005/0073135 A1* | 4/2005 | Choi | B60R 21/232 |
| | | | 280/730.1 |
| 2008/0246264 A1* | 10/2008 | Gerfast | B60N 2/4221 |
| | | | 280/801.1 |
| 2009/0295131 A1* | 12/2009 | Kim | B60R 21/214 |
| | | | 280/730.1 |
| 2011/0049845 A1* | 3/2011 | Choi | B60R 21/214 |
| | | | 280/728.2 |
| 2012/0049492 A1* | 3/2012 | Choi | B60R 21/2338 |
| | | | 280/730.1 |
| 2012/0080869 A1* | 4/2012 | Lee | B60R 21/214 |
| | | | 280/729 |
| 2013/0292927 A1* | 11/2013 | Lee | B60R 21/213 |
| | | | 280/730.1 |
| 2014/0327234 A1* | 11/2014 | Heurlin | B60R 21/207 |
| | | | 280/730.1 |
| 2016/0347272 A1* | 12/2016 | Kato | B60R 21/207 |
| 2017/0291565 A1* | 10/2017 | Yamamoto | B60R 21/207 |
| 2017/0291569 A1* | 10/2017 | Sugie | B60R 21/01552 |
| 2018/0222432 A1* | 8/2018 | Schneider | B60R 21/214 |
| 2019/0111883 A1* | 4/2019 | Thomas | B60R 21/231 |
| 2019/0161046 A1* | 5/2019 | Thomas | B60R 21/214 |
| 2019/0202394 A1* | 7/2019 | Obayashi | B60R 21/205 |
| 2019/0241141 A1* | 8/2019 | Sirous | B60N 2/42763 |

\* cited by examiner

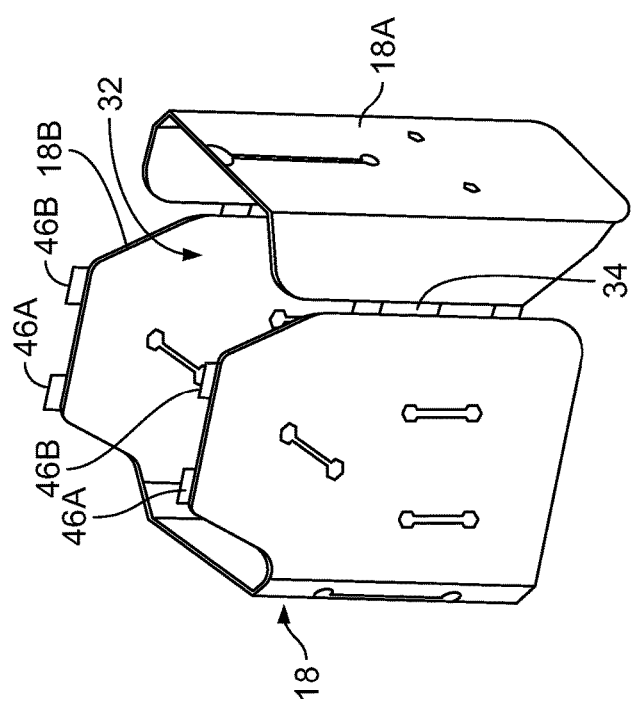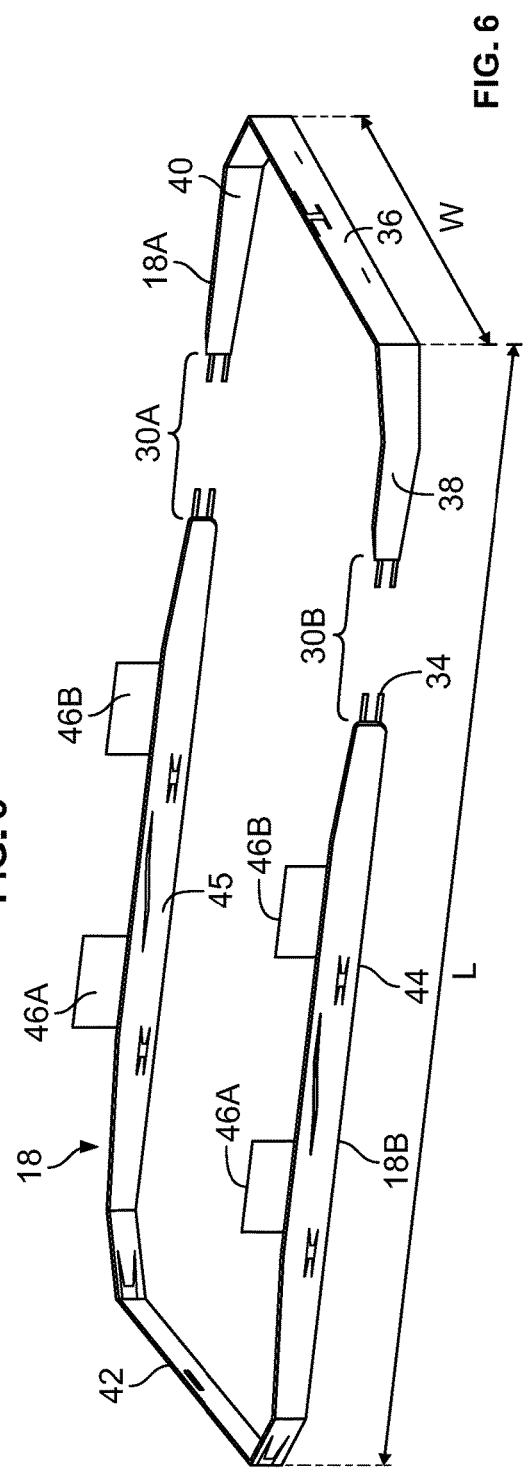

INFLATABLE SAFETY RESTRAINT SYSTEM FOR SURROUNDING A VEHICLE OCCUPANT

FIELD

The present disclosure generally relates to occupant safety restraint systems. More particularly, the present disclosure relates to an inflatable safety restraint system for surrounding a vehicle occupant.

BACKGROUND

This section provides background information related to the present disclosure which is not necessarily prior art.

Various passive and active occupant restraint systems are known for enhancing occupant protection in the event of a pending or actual vehicle impact. Passive systems are deployed with no action required by the occupant. For example, the use of frontal airbags protecting a vehicle occupant in the event a frontal crash or a laterally offset frontal crash is common in modern automotive technology. The frontal airbag for the driver is usually located in the hub area of the steering wheel and the frontal airbag for the front seated passenger is usually located inside the instrument panel.

While known inflatable restraint systems may have proven to be generally acceptable for their intended purposes, it remains desirable to advance the relevant art.

SUMMARY

This section provides a general summary of the disclosure, and is not a comprehensive disclosure of its full scope or all of its features.

In accordance with one particular aspect, the present teachings provide an inflatable safety restraint system that is downwardly deployable from a roof of a vehicle for protecting an occupant of the vehicle. The inflatable safety restraint system includes at least one inflatable airbag and at least one joint closing the shape of the at least one inflatable airbag to circumscribe an internal cavity. At least one inflator is in fluid communication with the at least one inflatable airbag for inflating the at least one airbag. Upon deployment, the inflatable safety restraint system defines a closed shape for surrounding the occupant of the vehicle.

In accordance with another particular aspect, the present teachings provide a related method of protecting an occupant of a vehicle with at least one inflatable airbag. The method includes closing a shape of the at least one inflatable airbag with a joint and attaching the at least one inflatable airbag to a roof of the vehicle. The method additionally includes downwardly deploying the at least one inflatable airbag from a stowed position proximate the roof. The method further includes surrounding the occupant of the vehicle with the at least one inflatable airbag such that the occupant is in a cavity defined by the closed shape of the at least one inflatable airbag.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a perspective view of the inflatable safety restraint system of the present teachings shown apart from the environment of FIGS. 1-3, the airbags of the safety restraint system shown unfolded and/or unrolled and shown prior to inflation.

FIG. 6 is an exploded perspective view of the inflatable safety restraint system of the present teachings shown apart from the environment of FIGS. 1-3, the airbags of the safety restraint system shown folded and/or rolled for stowing.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail, for example.

Figure 1:
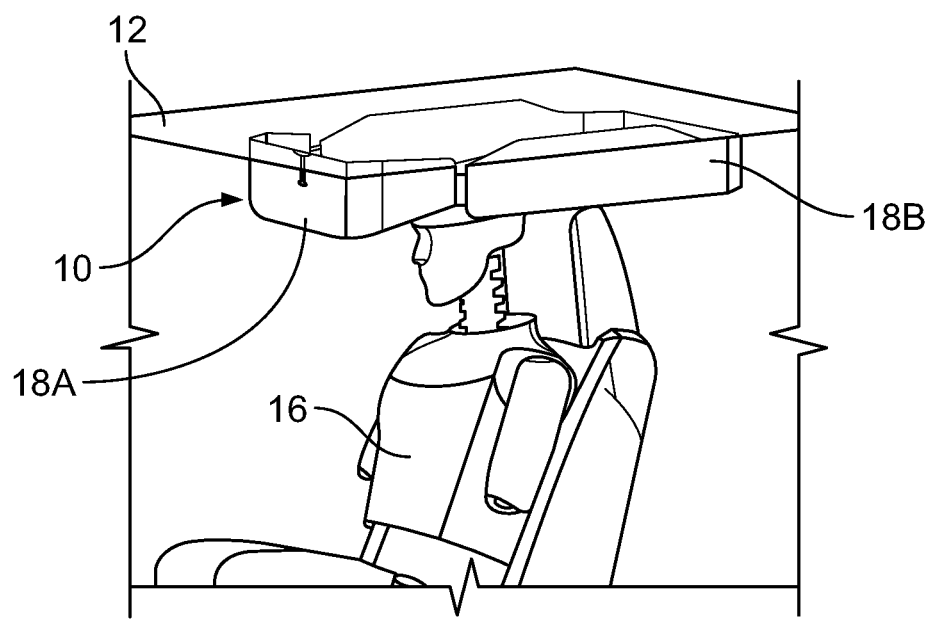
FIG. 1 is an environmental perspective view of an inflatable safety restraint system in accordance with the present teaching, the inflatable safety restraint system shown in a stowed condition and shown operatively associated with a seated vehicle occupant.
Figure 2:
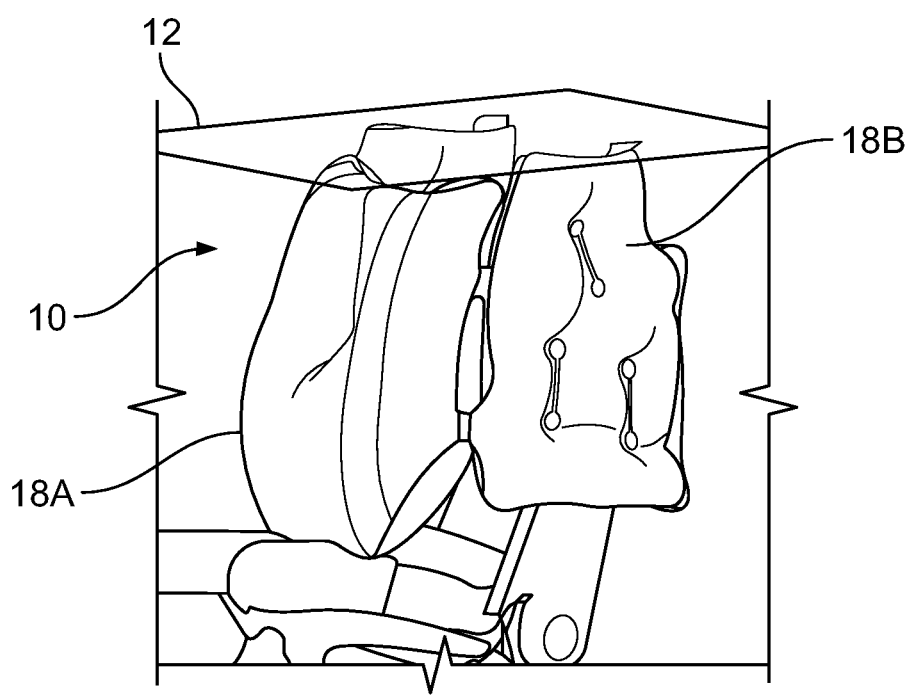
FIG. 2 is an environmental perspective view similar to FIG. 1, the inflatable safety restraint system shown in a deployed condition downwardly extending from a roof of the vehicle and surrounding the occupant.
Figure 3:
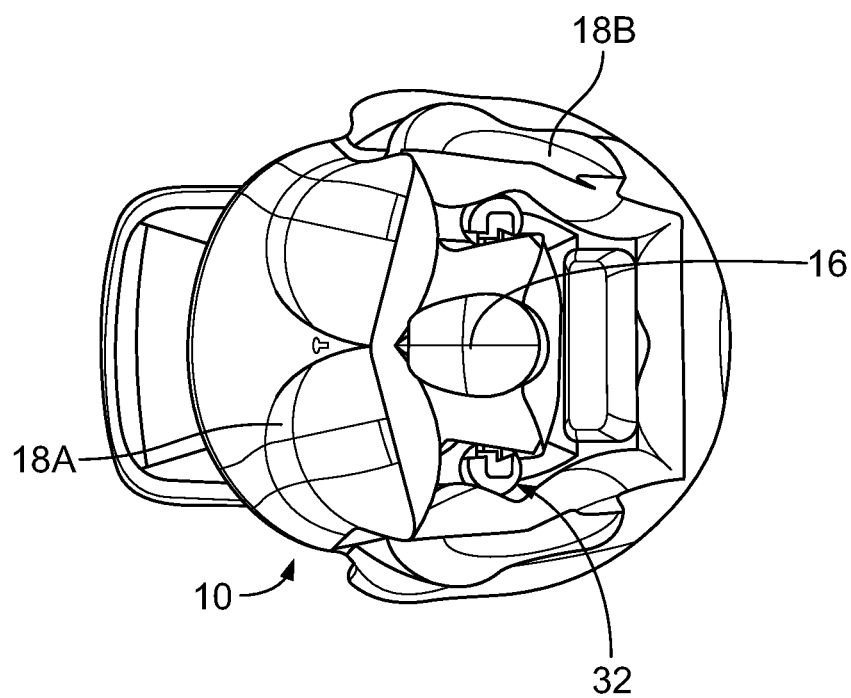
FIG. 3 is an environmental top view of the inflatable safety restraint system of FIG. 2, the inflatable safety restraint system shown in the deployed condition.
Figure 4:
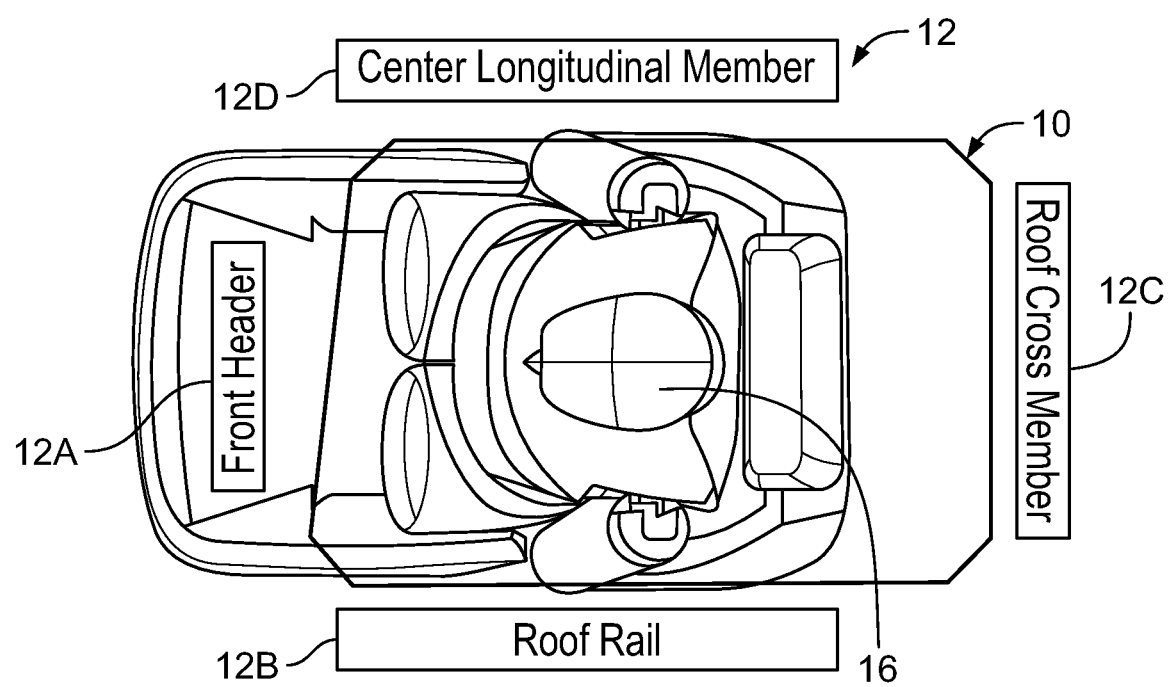
FIG. 4 is a top view of the occupant of FIG. 1 shown seated within an exemplary vehicle.
Figure 7:
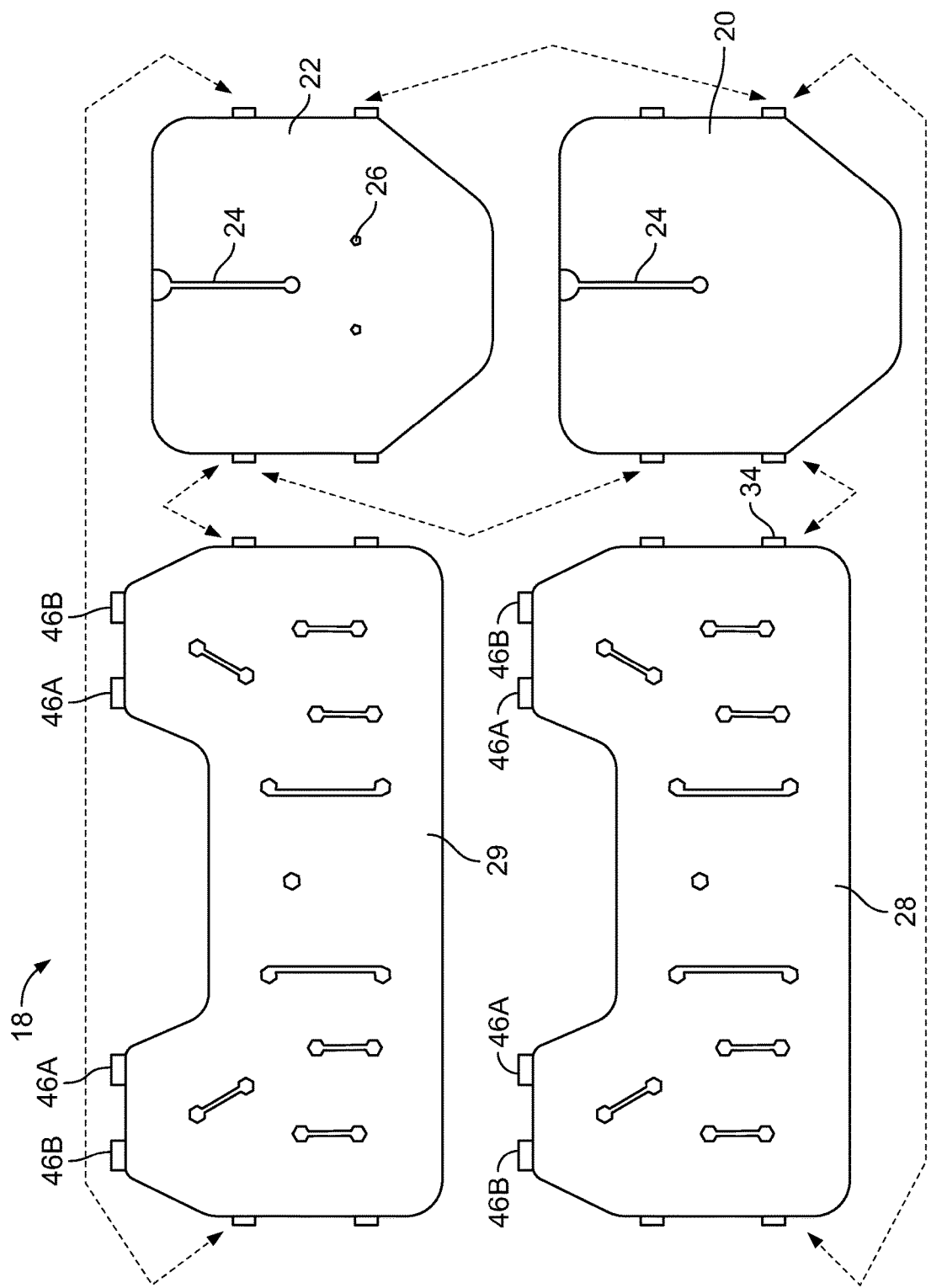
FIG. 7 is an exploded view of the panels of the inflatable safety restraint system prior to assembly.

With general reference to the FIGS. 1 through 10 of drawings, an inflatable safety restraint system constructed in accordance with the present teachings is illustrated and generally identified at reference character 10. As will become understood more fully below, the inflatable safety restraint system 10 of the present teachings is particularly adapted to be downwardly deployed from a roof 12 of a vehicle 14 for protecting an occupant 16 of the vehicle 14. The inflatable safety restraint system 10 is shown in FIG. 1 in a stowed condition and shown in FIG. 2 in a deployed condition.

The system 10 of the present teachings is shown operatively associated in the drawings with a simplified vehicle 14. It will be understood that the vehicle 14 is merely an exemplary type of vehicle into which the present teachings may be incorporate. In this regard, the present teachings may be readily adapted for use in other vehicles within the scope of the present teachings. Such other vehicles may include autonomous vehicles.

The system 10 of the present invention is shown to generally include at least one inflatable airbag 18. The at least one inflatable airbag 18 may comprise at least two inflatable airbags including a first inflatable airbag 18A and a second inflatable airbag 18B. In other embodiments, the at least one inflatable airbag 18 may include a single airbag 18. As perhaps best shown in FIG. 3, the airbags 18 cooperate to completely surround or circumscribe the passenger 16 and seat together upon deployment. If the seat is positioned out of the predefined coverage zone but occupant is still inside the zone such as out-of-position situation, the airbags 18 may surround only the passenger 16 to prevent potential occupant $2^{nd}$ hard contact with the vehicle interior.

The first inflatable airbag 18A defines a single chamber and may comprise a front cushion constructed of a first inner panel 20 (facing the passenger 16 upon deployment) and a first outer panel 22 (facing away from the passenger 16 upon deployment). The first inflatable airbag 18A may include internal tethers 24 (e.g., zero tethers) to define a depth of the first inflatable airbag 18A, for example, and discrete vents 26 for controlling the time inflation of the first inflatable airbag 18A is maintained after deployment. The depth and deployed shape of the first inflatable airbag 18A may be varied depending on the vehicle structure, interior layout and other restraint systems to absorb the applied energy at the frontal impact.

The second inflatable airbag 18B similarly defines a single chamber and may comprise a surround cushion similarly constructed of a second inner panel 28 (facing the passenger 16 upon deployment) and a second outer panel 29 (facing away from the passenger 16 upon deployment). The second inflatable airbag 18B may also include internal tethers 24 (e.g., zero tethers) to define a depth of the second inflatable airbag 18B as well as guiding gas flow downward on time, for example, and discrete vents 26 (not shown on the second inflatable airbag 18B) for controlling the time inflation of the second inflatable airbag 18B is maintained after deployment. The second inflatable airbag 18B may have different depths: two lateral clearances between seat and door and adjacent seat, and the required cushion depth for the $2^{nd}$ row occupant head protection at front impact case. As above, the depth and deployed shape of the second inflatable airbag 18B may be varied depending on vehicle structure, interior layout and other restraint systems to absorb the applied energy at the side impact. In the embodiment illustrated, the first inflatable airbag 18A has a greater depth than the second inflatable airbag 18B. Explaining further, the depth of the front 36 of the first and second lateral sides 44 and 45 of the second inflatable airbag 18B. The depth of the rear 42 of the second inflatable airbag 18B is less than the depth of the front 36 of the first inflatable airbag 18A but less than the depth of the first and second lateral sides 44 and 45 of the second inflatable airbag 18B. In this manner, the system 10 can protect the occupant from frontal and side impacts and also protect a second row occupant from frontal impacts.

The system 10 further includes at least one joint 30 closing the shape of the at least one inflatable airbag 18 to circumscribe an internal cavity 32. In the embodiment illustrated, the at least one joint includes a first joint 30A and a second joint 30B. These joints 30A and 30B couple the first and second inflatable airbags 18A and 18B in a generally horizontal plane. The joints 30 may comprise a plurality of tabs 34. Adjacent tabs 34 may be sewn or otherwise secured to one another. Explaining further, each joint 30 may include at least one tab 34 extending from the first inflatable airbag 18A and at least one corresponding tab 34 extending from the second inflatable airbag 18B.

The first and second inflatable airbags 18A and 18B may be rolled or folded for stowing. The stowed configuration of the system 10 is shown in FIGS. 1 and 6, for example. Explaining further, the second inflatable airbag 18B may be rolled or folded in a manner similar to a conventional curtain side airbag. The first inflatable airbag 18A may be similarly rolled or folded. Significant to the present teachings, the stowed conditions of the first and second inflatable airbags 18A and 18B need not be achieved in the same manner. In this regard, the first inflatable airbag 18A may be folded (e.g., z-folded) and the second inflatable airbag 18B may be rolled, for example. The first and second inflatable airbags 18A and 18B may be individually folded or rolled and subsequently joined. As stowed, the first inflatable airbag 18A may include a forward side 36 and first and second lateral sides 38 and 40. The second inflatable airbag 18B may similarly include a rear side 42 and first and second lateral sides 44 and 45. At least in the stowed orientation, the first and second inflatable airbags 18A and 18B cooperate to generally define a rectangular shape have a length L in a vehicle longitudinally extending direction and a width W in a cross-car direction. In one particular application, the length of the rectangular shape may be greater than the width W.

The system 10 is carried by the roof 12 of the vehicle 14. The roof structure may conventionally include a front header 12A, a roof rail 12B, and a roof cross member 12C. The roof structure may additionally include a center longitudinal member 12D. This structure will be understood to be beyond the scope of the present teachings.

The first and second inflatable airbags 18A and 18B may be attached to the roof 12 of the vehicle 14 at a plurality of attachment points 46. These attachment points may be selected from a group consisting of fixed attachment points 46A, releasable attachment points 46B and tear away attachment points 46C. The releasable attachment points 46B may utilize a tether release mechanism or a cable cutter, for example, and may function to release tension in the second inflatable airbag 18B and facilitate ride-down of the airbag 18B. The tear away attachment points 46C may be similar to conventional attachments points for inflatable curtains, for example, used simply for installation purposes.

The first and second lateral sides 44 and 45 of the second inflatable airbag 18B may be attached to the roof 12 at least one fixed attachment point 46A and at least one releasable attachment point 46B. In the embodiment illustrated, the first lateral side 44 is attached to the center longitudinal member 12D of the roof 12 at a fixed attachment point 46A and a releasable attachment point 46B. The second lateral side 44 is attached to the roof rail 12B of the roof 12 similarly at a fixed attachment point 46A and a releasable attachment point 46B. With reference to a vehicle longitudinal direction, the fixed attachment points 46A are disposed rearward of the releasable attachment points.

The first and second inflatable airbags 18A and 18B may be further attached to the roof 12 at a plurality of tear away attachment points 46C. In the embodiment illustrated, the front 36 of the first inflatable airbag 18A is attached to the front header 12A of the roof at a series of tear away attachment points 46C. The first and second lateral sides 44 and 45 of the second inflatable airbag 18B may be attached to the center longitudinal member 12D and the roof rail 12B, respectively, at tear away attachment points 46C. Similarly, the rear 42 of the second inflatable airbag 18B may be attached to the roof cross member 12C at one or more tear away attachment points 46C.

The system 10 of the present teachings is further illustrated to include at least one inflator 50 in fluid communication with the at least one inflatable airbag 18 for inflating the at least one airbag 18. In the embodiment illustrated, the system 10 includes a first inflator 50A in fluid communication with the chamber of the first inflatable airbag 18A and a second inflator 50B in fluid communication with the chamber of the second inflatable airbag 18B. In the embodiment illustrated, the first inflatable airbag 18A includes a common inflatable chamber that extends through the front 36 and first and second lateral sides 38 and 40 and the second inflatable airbag 18B similarly includes a common inflatable chamber extending through the rear 42 and first and second lateral sides 44 and 45. Alternatively, a single inflator 50A may be used in conjunction with a divider tube to inflate both the first and second inflatable airbags 18A and 18B. The first inflator 50A may be mounted to the front header 12A of the roof and the second inflator 50B may be mounted to the roof rail 12B of the roof, for example.

The first inflatable airbag 18A may have a first fill rate and the second inflatable airbag 18B may have a second, distinct fill rate. Where the system 10 includes first and second inflators 50A and 50B, the inflators can be individually calibrated in a known manner to provide a desired fill rate. Alternatively, a single inflator may be utilized in conjunction with flow limiting devices to provide distinct fill rates.

Deployment of the system 10 may be controlled by conventional sensors. In this regard, an on-board controller may receive signals from conventional sensors that indicate an actual or impending collision event, for example. In response to signals indicative of predetermined events, the controller may command the inflators 50 to deploy the first and second inflatable airbags 18A and 18B from the stowed condition to the deployed condition. The controller may further cooperate with other sensor to block deployment in certain circumstances. The other sensors may include seat tracking sensors, seat back angle sensors, and the like. Such other sensors may be used to block deployment in certain out-of-position situations, for example.

Upon deployment, the first and second inflatable airbags 18A and 18B cooperate to surround the occupant 16. The first inflatable airbag 18A is positioned generally forward of the occupant 16. The second inflatable airbag 18B surrounds the occupant on three sides.

Figure 11:
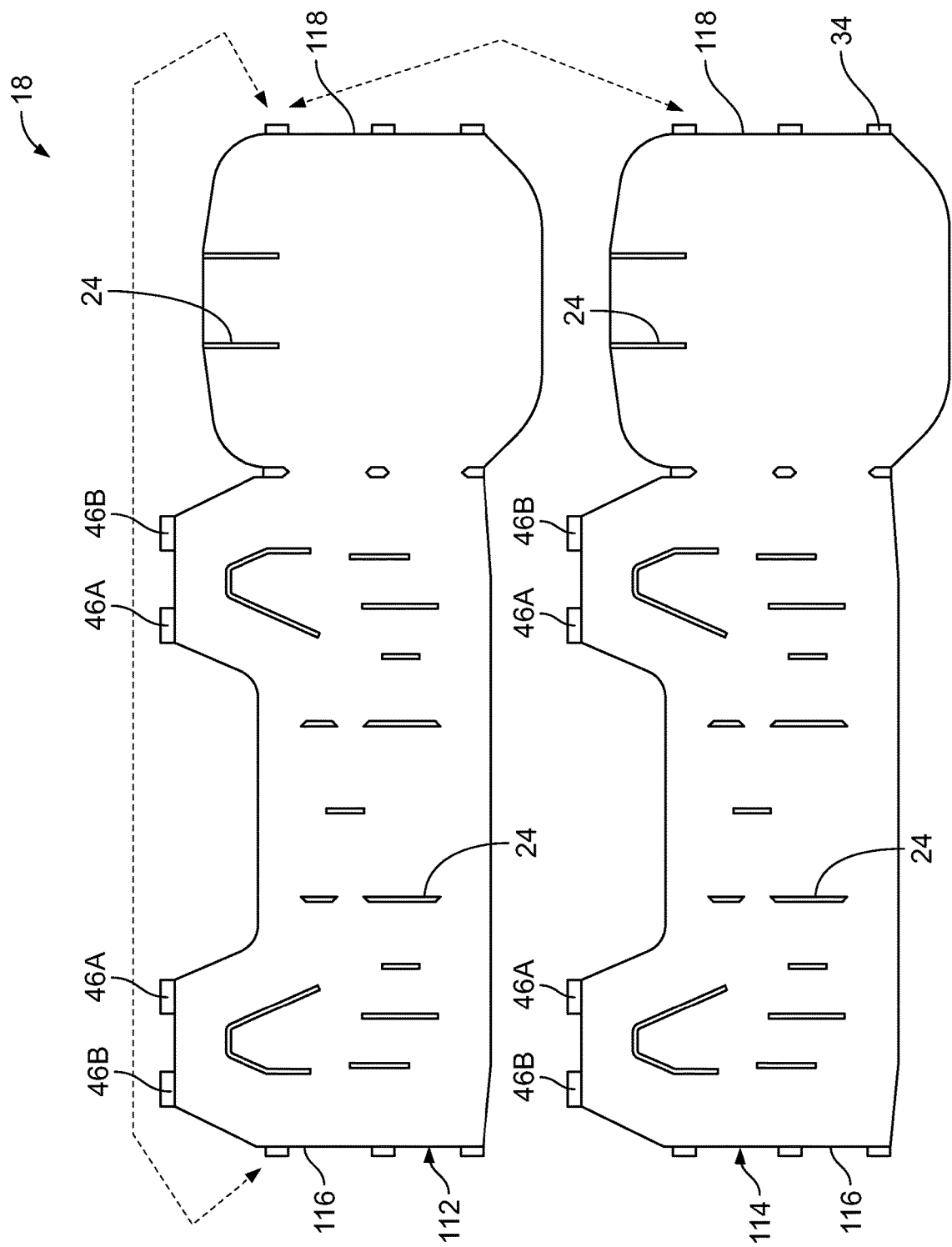
FIG. 11 is a view similar to FIG. 7, illustrating an alternative inflatable safety restraint system in accordance with the present teachings, the alternative inflatable safety restraint system including a single airbag for defining a closed shape to surround an occupant of the vehicle.
Figure 12:
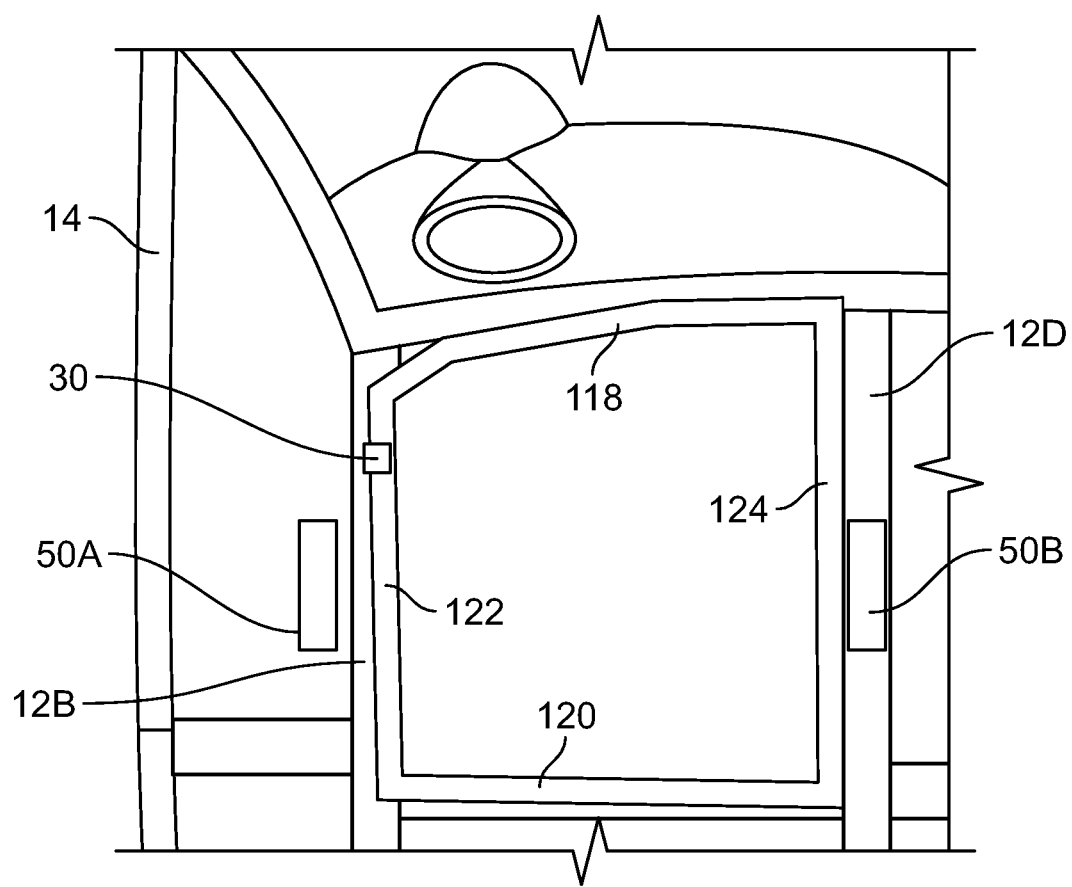
FIG. 12 is a view similar to FIG. 9 illustrating the alternative inflatable safety restraint system of FIG. 11.

Turning to FIGS. 11 and 12, another inflatable safety restraint system constructed in accordance with the present teachings is illustrated and generally identified at reference character 110. The system 110 differs from the system 10 primarily by incorporating a single inflatable airbag 112. Given the similarities between the systems 10 and 110, like reference characters will be used to identify similar elements. It will be understood that other details of the system 110 may be identical to corresponding details of the system 10.

The single inflatable airbag 18 of the system 10 defines a single chamber for inflation. The inflatable airbag 18 is configured to completely surround or circumscribe the passenger 16 upon deployment. The inflatable airbag 18 may comprise a cushion constructed of an inner panel 112 (facing the passenger 16 upon deployment) and an outer panel 114 (facing away from the passenger 16 upon deployment). The inflatable airbag 18 may include internal tethers 24 (e.g., zero tethers) to define a depth of the first inflatable airbag 18A, for example, and discrete vents 26 for controlling the time inflation of the inflatable airbag 18 is maintained after deployment.

The system 110 further includes a joint 30 closing the shape of the inflatable airbag 18 to circumscribe an internal cavity 32. The joint 30 couples the first and second ends 116 and 118 of the inflatable airbag 18 in a generally horizontal plane. The joint 30 may comprise a plurality of tabs 34. Adjacent tabs 34 may be sewn or otherwise secured to one another. Explaining further, the joint 30 may include at least one tab 34 extending from a first end 116 of the inflatable airbag 18 and at least one corresponding tab 34 extending from the second end of the inflatable airbag 18.

The system 110 of the present teachings is further illustrated to include at least one inflator 50 in fluid communication with the at least one inflatable airbag 18 for inflating the at least one airbag 18. In the embodiment illustrated, the system 110 includes a first inflator 50A and a second inflator 50B. Alternatively, a single inflator 50A may be used.

As shown in FIG. 12, the inflatable airbag 18 may include a forward portion 118, a rearward portion 120 and first and second lateral portions 122 and 124. The inflatable airbag 18 may be configured to provide sections with different fill rates and different depth.

Figure 8:
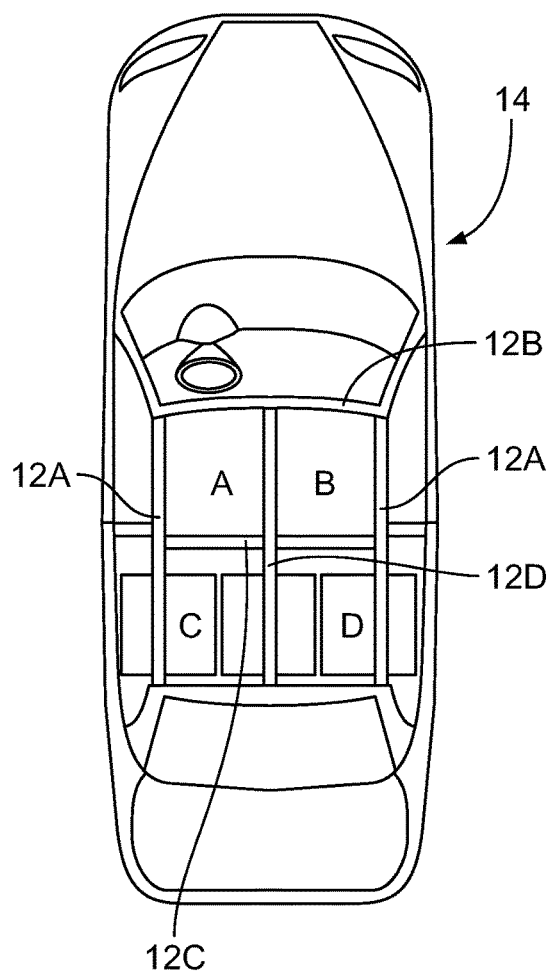
FIG. 8 is a simplified top view of an exemplary vehicle for use with the of the inflatable safety restraint system of the present teachings.

The above descriptions illustrate and describe the present teachings in connection with a driver quadrant A of a conventional vehicle. The present teachings may be similarly extended to other quadrants of the vehicle. The other quadrants B, C and D are shown in FIG. 8. Explaining further, each quadrant A, B, C and D may incorporate its own inflatable restraint system 10. The second row center occupant may be protected by the airbags of quadrants A, B, C and D. In this vehicle, the center longitudinal member 12D extends from the front header 12A to a rear header.

Figure 8A:
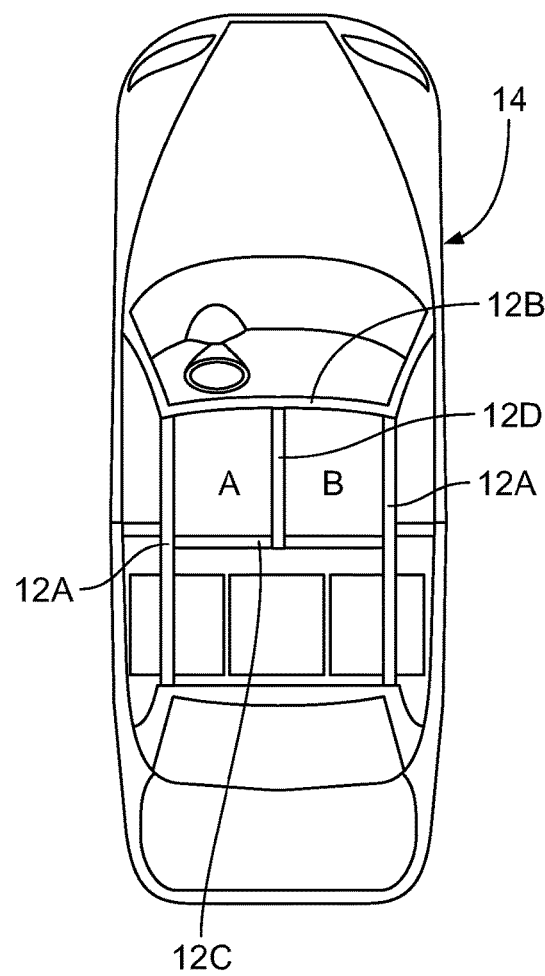
FIG. 8A is a simplified top view of another exemplary vehicle for use with the of the inflatable safety restraint system of the present teachings.
Figure 9:
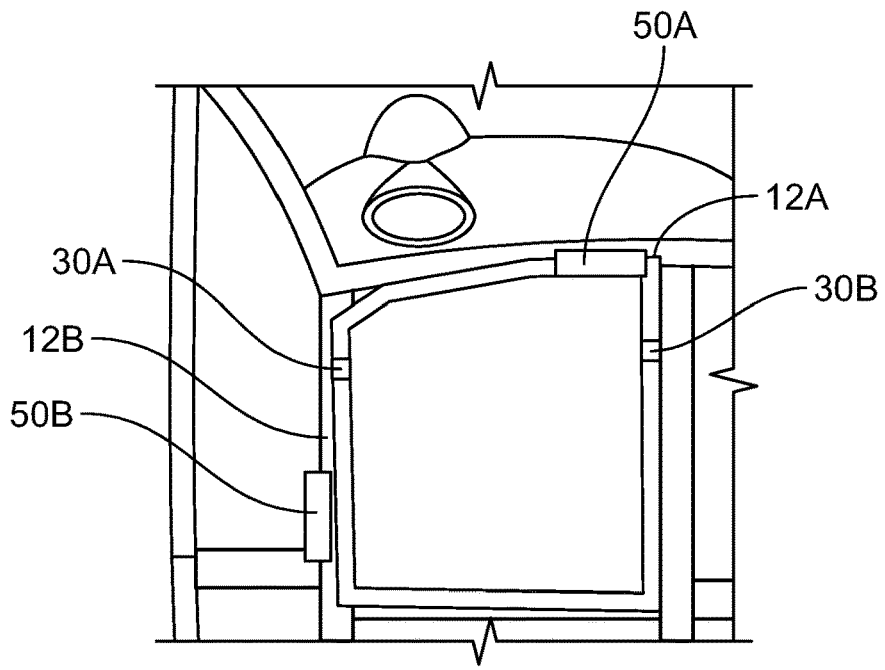
FIG. 9 is an enlarged view of a portion of the exemplary vehicle of FIG. 8 shown incorporating the inflatable safety restraint system of the present teachings.
Figure 10:
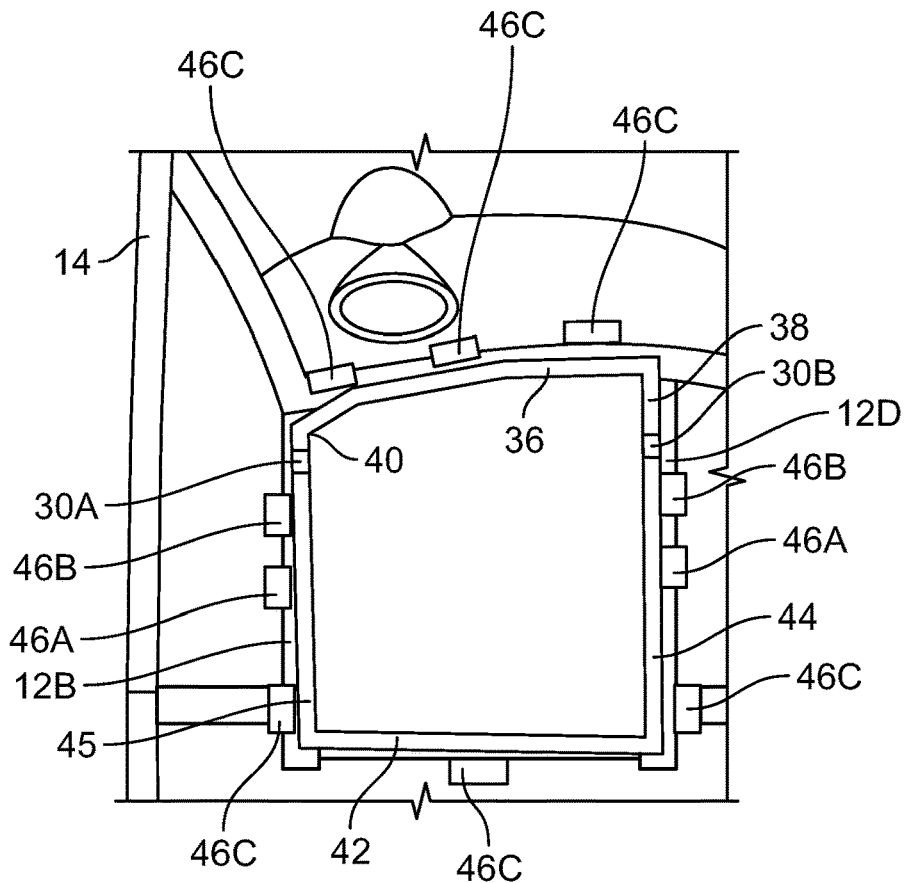
FIG. 10 is a view similar to FIG. 9 schematically illustrating attachment of the inflatable safety restraint system to the roof of the vehicle.

FIG. 8A illustrates a variant in which the center longitudinal member 12D only extends from the front header 12A to the roof cross member 12C. In this application, the front occupants of the vehicle may be protected by respective inflatable restraint systems 10 of the present teachings, the second row occupants may be protected from side impact with conventional curtain airbags and from front impact by the airbags of quadrants A and B. In other applications, the present teachings may be adapted for use with vehicle in which the passengers may not have traditionally dedicated seating areas or seating orientations, including but not limited to an autonomous vehicle.

It will now be appreciated that the present teachings provide a system for protecting a vehicle occupant with one or more inflatable airbags that an occupant from occupant-to-occupant impact or interior second impact in any direction. The occupant may be in various positions. The present system further provides a system for better managing uneven energy levels between frontal/side and rear impact load cases.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, where the present teachings are used in connection with a bench seat, a single airbag may extend across all seating positions and may be deployed by a single inflator.

What is claimed is:

1. An inflatable safety restraint system downwardly deployable from a roof of a vehicle for protecting an occupant of the vehicle, the inflatable safety restraint system comprising:
   at least one inflatable airbag; and
   at least one inflator in fluid communication with the at least one inflatable airbag for inflating the at least one inflatable airbag,
   wherein the inflatable safety restraint system defines a closed shape for surrounding the occupant of the vehicle upon deployment,
   and wherein the at least one inflatable airbag includes a first inflatable airbag having a first fill rate and a second inflatable airbag having a separate and distinct second fill rate.

2. The inflatable safety restraint system of claim 1, wherein the first inflatable airbag has a first depth in a vehicle longitudinal direction and the second inflatable airbag has a second depth in a direction perpendicular to the vehicle longitudinal direction, the first being greater than the second depth.

3. The inflatable safety restraint system of claim 2, wherein the first inflatable airbag has a depth and a shape to absorb applied energy at frontal impact and the second inflatable airbag has a shape and a depth to prevent a second row occupant head strike-through at the frontal impact.

4. The inflatable safety restraint system of claim 1, wherein the second inflatable airbag includes first and second lateral sides and a rear side, the second inflatable airbag further including a common inflatable chamber extending through the first and second lateral sides and the rear side.

5. The inflatable safety restraint system of claim 1, wherein the at least one joint includes a plurality of tabs.

6. The inflatable safety restraint system of claim 1, wherein the at least one joint includes at least one tab carried by the first inflatable airbag and at least one corresponding second tab carried by the second inflatable airbag, the at least one tab sewn or otherwise secured to the at least one corresponding tab.

7. The inflatable safety restraint system of claim 1, wherein the at least one airbag includes a single inflatable airbag.

8. The inflatable safety restraint system of claim 1, wherein in a stowed condition of the system, the first inflatable airbag is folded and the second inflatable airbag is rolled.

9. The inflatable safety restraint system of claim 1, wherein the at least one inflatable airbag is attached to the roof of the vehicle at a plurality of attachment points, the attachment points of the plurality of attaching points selected from a group consisting of fixed attachment points, releasable attachment points and tear away attachment points.

10. The inflatable safety restraint system of claim 1, wherein the second inflatable airbag includes a first lateral side, a second lateral side and a rear side.

11. The inflatable safety restraint system of claim 1, in combination with the vehicle.

12. An inflatable safety restraint system downwardly deployable from a roof of a vehicle for protecting an occupant of the vehicle, the inflatable safety restraint system comprising:
   a single inflatable airbag;
   and at least one inflator in fluid communication with the single inflatable airbag for inflating the single inflatable airbag, wherein the inflatable safety restraint system defines a closed shape for surrounding the occupant of the vehicle upon wherein the inflatable safety restraint system includes at least one joint having at least one tab carried at a first end of the single inflatable airbag and at least one corresponding tab carried at a second end of the single inflatable airbag, the at least one tab sewn or otherwise secured to the at least one corresponding tab.

13. An inflatable safety restraint system downwardly deployable from a roof of a vehicle for protecting an occupant of the vehicle, the inflatable safety restraint system comprising:

at least one inflatable airbag; and at least one inflator in fluid communication with the at least one inflatable airbag for inflating the at least one airbag, wherein the inflatable safety restraint system defines a closed shape for surrounding the occupant of the vehicle upon deployment, the at least one inflatable airbag includes a first lateral side, a second lateral side and a rear side, and wherein the first and second lateral sides of the at least one inflatable airbag are both attached to the roof at at least one release mechanism.

14. The inflatable safety restraint system of claim 13, wherein the first and second lateral sides of the at least one inflatable airbag are both further attached to the roof at least one fixed attachment point.

* * * * *